United States Patent

Machida et al.

[11] Patent Number: 5,980,765
[45] Date of Patent: Nov. 9, 1999

[54] METHOD OF MANUFACTURING COMPOSITE CERAMICS BALLS FOR BALL-POINT PENS

[75] Inventors: Takao Machida, Abiko; Tooru Ishijima, Yuuki-gun, both of Japan

[73] Assignee: Ohto Kabushiki Kaisha, Tokyo, Japan

[21] Appl. No.: 08/941,194

[22] Filed: Sep. 30, 1997

Related U.S. Application Data

[63] Continuation-in-part of application No. PCT/JP97/00098, Jan. 20, 1997.

[30] Foreign Application Priority Data

Feb. 1, 1996 [JP] Japan ................................. 8-016604

[51] Int. Cl.$^6$ .............................. B43K 1/08; C04B 41/91
[52] U.S. Cl. .................................. 216/52; 216/96; 451/50
[58] Field of Search ........................ 216/52, 96, 99, 216/101, 102, 104; 451/50

[56] References Cited

U.S. PATENT DOCUMENTS

| | | |
|---|---|---|
| 3,520,630 | 7/1970 | Gordon et al. |
| 4,318,770 | 3/1982 | Chakupurakai. |
| 4,621,936 | 11/1986 | Hansson et al. ........................ 401/215 |
| 4,653,950 | 3/1987 | Yoshida .................................. 401/215 |
| 4,977,114 | 12/1990 | Horinouchi et al. ................... 501/104 |

FOREIGN PATENT DOCUMENTS

| | | |
|---|---|---|
| 56-140063 | 11/1981 | Japan. |
| 58-138698 | 8/1983 | Japan. |
| 59-135195 | 8/1984 | Japan. |
| 6-33197 | 5/1994 | Japan. |
| 8-207481 | 8/1996 | Japan. |

*Primary Examiner*—Mark L. Bell
*Assistant Examiner*—David Sample
*Attorney, Agent, or Firm*—Wenderoth, Lind & Ponack, L.L.P.

[57] ABSTRACT

Using a newly developed composite ceramics material suited for balls of ball-point pens, a method of manufacturing composite ceramics balls for ball-point pens that have affinity for both oil-based ink and water-based ink is provided. In this method, the composite ceramics, whose main components are mullite ($3Al_2O_3 \cdot 2SiO_2$) and zirconia ($ZrO_2$) at the ratio of 50–95% to 5–50% by weight, is polished into mirror-finished balls and then chemical processing or physical processing is performed on the ball surfaces to form indentations in the ball surfaces. The chemical processing is preferably an etching using hydrofluoric acid, and the degree of indentations can be controlled by changing the concentration of hydrofluoric acid and the duration of etching.

3 Claims, 1 Drawing Sheet

METHOD OF MANUFACTURING COMPOSITE CERAMICS BALLS FOR BALL-POINT PENS

This application is a continuation-in-part of International Application PCT/JP97/00098 filed Jan. 20, 1997.

FIELD OF INVENTION

The present invention relates to a method of manufacturing composite ceramics balls to be attached to the tips of ball-point pens, and more specifically to a method of manufacturing ceramics balls for ball-point pens having good affinity for both oil-based ink and water-based ink.

BACKGROUND ART

Oil-based inks have long been used widely with ball-point pens. The oil-based inks, however, have a drawback of corroding metallic balls, and to overcome this corrosion problem, cemented carbide balls using tungsten carbide have been developed.

As water-based inks have begun to be used for the ball-point pens in recent years, even the cemented carbide balls sometimes fail to offer sufficient corrosion resistance. To deal with this situation, chemically inert ceramics balls having high corrosion resistance against water-based inks have been developed. These ceramics balls use various kinds of ceramics material, such as alumina ceramics, silicon carbide ceramics and zirconia ceramics.

Although the ceramics materials mentioned above pose no problem in terms of corrosion resistance, they have the following drawbacks and thus are not satisfactory.

The alumina ceramics balls are currently not used very much because they easily chip or crack due to flaws in their crystal structure when they are polished into balls and it is difficult to produce satisfactory ball surfaces.

The silicon carbide ceramics balls, though there is no problem with mechanical strength, have a drawback that the dense, hard sintered body with a surface Vickers hardness (Hv) of 2000 or higher makes polishing difficult. For satisfactory polishing, however, the preferred hardness should be not more than Hv 2000. Because the perfectly sintered ideal silicon carbide has Hv 2400–2600, the sintering process must be stopped halfway to make the hardness less than Hv 2000. This may cause variations in the hardness of the sintered silicon carbide or make void control on the ball surface difficult.

To improve affinity between balls and ink, it is common practice with cemented carbide balls that their mirror-finished surfaces are formed with fine indentations. Since the silicon carbide ceramics balls are very hard, appropriate indentations cannot be formed in their surfaces and there is no alternative but to use the mirror-finished balls. Therefore, the affinity between the ball surface and ink is insufficient, and this easily causes line break and line splitting while writing.

The zirconia ceramics balls are lower in hardness than silicon carbide and thus polishing is easier, but their drawback is that scratches are easily formed in the ball surfaces. If a ball with scratches is used, a ball seat supporting the ball in the tip of a ball-point pen will wear significantly, with the result that the ball position is retracted from the normal one (a ball sink phenomenon), and the writing feel is badly degraded.

The mirror surface of the zirconia ceramics ball has very few voids with its state similar to glass, so its wettability with water-based ink or adhesion and holding capability with oil-based ink is not enough, causing line break and line splitting during writing in some cases. Hence, it is necessary to check that the kind of ink used is an appropriate one.

DISCLOSURE OF THE INVENTION

The present invention has been accomplished to develop a new composite ceramics that eliminates the drawbacks experienced with the conventional ceramics materials and is suitable for balls used in ball-point pens, and to provide a method of manufacturing, by using the composite ceramics, composite ceramics balls for ball-point pens having affinity both for oil-based ink and water-based ink.

The inventors of this invention examined various ceramics materials suited for the balls of ball-point pens and found that mullite-zirconia composite ceramics containing mullite $(3Al_2O_3 \cdot 2SiO_2)$ and zirconia $(ZrO_2)$ at a specified ratio is suited for polishing to mirror-finish the balls and for making indentations in the ball surface and that the balls thus formed have satisfactory affinity for both oil-based ink and water-based ink. Based on these findings the inventors have accomplished this invention.

To describe in more detail, the method of manufacturing composite ceramics balls for ball-point pens according to this invention comprises the steps of: polishing a composite ceramics into mirror-finished balls, the composite ceramics being made mainly of mullite $(3Al_2O_3 \cdot 2SiO_2)$ and zirconia $(ZrO_2)$ with a mullite to zirconia ratio of 50–95% by weight to 5–50% by weight; and performing chemical processing or physical processing on the surfaces of the balls to form indentations in the ball surfaces.

To secure a stable written line about 1000 meters long with an ordinary writing pressure (about 50–300g/cm$^2$) and a long storage stability (three or more years in a capped state), what is required of the balls of ball-point pens is to have (1) a mechanical strength, (2) a wear resistance, (3) a corrosion resistance and (4) affinity for ink.

As to the mechanical strength, the 100% mullite ceramics has low fracture toughness of about 2.5 MN/m$^{3/2}$ and thus easily chips or cracks during the polishing of balls. Even when the balls are finished without chips or cracks, they easily chip or crack from the external pressure impacts during the course of fitting them in the tips. This invention, on the other hand, mixes more than 5 weight % of zirconia to produce mullite-zirconia composite ceramics, which has an improved fracture toughness of about 4–5 MN/m$^{3/2}$ almost equal to that of silicon carbide. The mullite-zirconia composite ceramics of this invention, because of its mechanical strength, is therefore a preferable ceramics material for the balls of ball-point pens.

As for the wear resistance, as described later, because the mullite-zirconia composite ceramics used in this invention can be made in the form of a sintered body of uniformly dispersed fine composite powder of mullite and zirconia, the balls of such a sintered body has high mechanical strength and wear resistance. Further, this composite ceramics hardly wears the ball seat made of German silver, stainless steel or brass.

As to the corrosion resistance, the mullite-zirconia composite ceramics is a stable oxide which is very unlikely to react with ink and thus has an excellent corrosion resistance as with the conventional ceramics balls.

In terms of affinity for ink, this invention makes controlled indentations in the ball surface, which was mirror-finished by polishing, in order to improve the wettability with water-based ink and the adhesion and holding ability with respect to oil-based ink. As a result, the balls of this invention exhibits good affinity for both water-based ink and oil-based ink. In forming indentations in the mirror-finished ball surface, precise control is needed not to make excess indentations. When the ratio of zirconia in the mullite-zirconia composite ceramics exceeds 50%, the indentation formation on the ball surface becomes difficult to control.

As described above, in terms of improving both ink affinity and mechanical strength, this invention sets the zirconia content in the mullite-zirconia composite ceramics at 5–50%. From the standpoint of mechanical strength and of the control of indentation formation in the ball surface, the zirconia content should preferably be set at 10–30%.

BEST MODE FOR CARRYING OUT THE INVENTION

Figure 1:
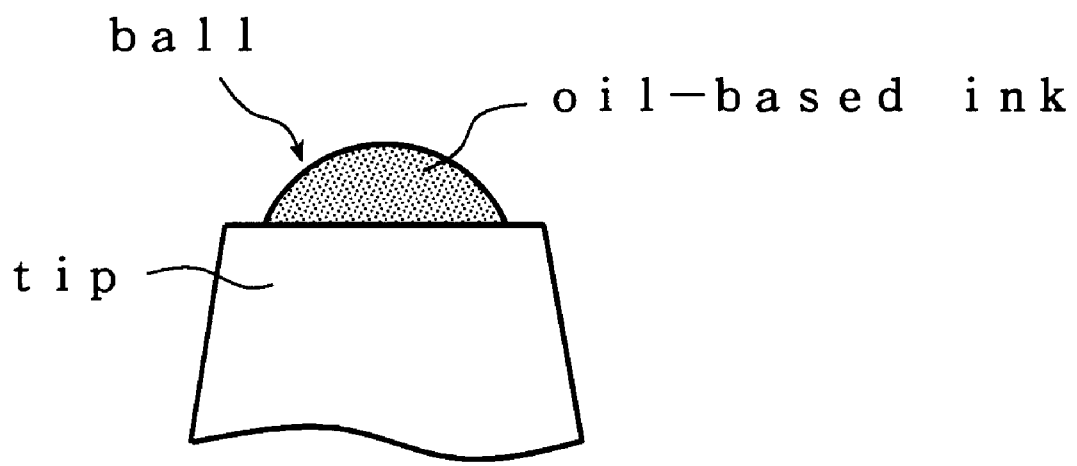
FIG. 1 is a schematic view showing the state of ink adhering to the ball surface immediately after writing in an ink adhesion and holding capability test on a ball of a ball-point pen using oil-based ink.

Mullite-zirconia composite ceramics used as a ceramics material in this invention can be made by sintering a composite powder. The methods of making the composite powder include a sol-gel method, which mixes alumina sol, silica sol and zirconia sol and transforms them into gel; a coprecipitation method, which coprecipitates aluminum nitrate, silica sol and zirconium oxychloride; an alkoxide method; and hydrothermal synthesis method. All of these methods use solutions as source materials to produce a mullite-zirconia composite powder of uniformly dispersed fine particles. A desired mixture ratio of mullite and zirconia in the composite powder is obtained by adjusting the amounts of materials so that the materials in solution have the desired ratio.

The composite powder obtained in this way is then formed into balls or pellets under the molding pressure of 500–1000 kg/cm$^2$, after which they are normally sintered in the temperature range of 1580–1650° C. for more than one hour in air to produce a composite ceramics that can be used as the material for the balls of ball-point pens.

The balls or pellets of composite ceramics are then polished for mirror finish. The common polishing method conventionally used to manufacture the ceramics balls of ball-point pens can also be employed in this invention.

In this invention, the surfaces of mirror-finished balls are further subjected to chemical or physical processing to form fine indentations in the surface. The preferred chemical processing is an etching using hydrofluoric acid. With this etching, when the mirror-finished balls are immersed in hydrofluoric acid, components other than mullite in the mullite-zirconia composite ceramics that forms the balls are selectively dissolved away thus forming desired indentations. The degree of indentations can be controlled properly by setting desired etching conditions, such as the concentration of hydrofluoric acid, processing temperature and processing time (etching time). The degree of indentations in the ball surfaces can also be controlled by changing the contents of zirconia in the mullite-zirconia composite ceramics. Because zirconia is dissolved in hydrofluoric acid, increasing the mixture ratio of zirconia in the composite ceramics increases the size of indentations in the ball surfaces. When the mixture ratio of zirconia in the mullite-zirconia composite ceramics exceeds 50% by weight, the indentations becomes excessively large making the indentation formation control difficult.

The physical processing for making indentations in the ball surfaces includes, for example, a honing processing which uses a lapping powder and processes the balls for a short period of time so that the outer diameter precision of the balls is not affected.

Example 1 (Test to verify the affinity for water-based ink)

A 75% mullite-25% zirconium composite powder was made by the sol-gel method and molded into a plate under the molding pressure of 750 kg/cm$^2$. The molded plate was then sintered in air at the temperature of 1640° C. for two hours and a 75% mullite-25% zirconium composite ceramics was produced. Vickers hardness (Hv) of the composite ceramics was 1100–1200 and its fracture toughness was 4.8 MN/m$^{3/2}$.

The surface of the composite ceramics plate was buffed to a mirror surface by using colloidal silica polishing powder. The mirror surface was etched by 23% hydrofluoric acid at 25° C. to form fine indentations. The degree of indentations was controlled by changing the etching time.

Tests were conducted on the indented surface of the composite ceramics plate to check its affinity for water-based ink. The affinity for water-based ink can be verified by examining wettability of the composite ceramics surface with ink. The wettability can be checked by measuring a contact angle $\theta$ between the ceramics surface and the ink. The smaller the contact angle $\theta$, the better the wettability. The relation between the contact angle $\theta$ and the etching time spent to form indentations in the ball surface is shown in Table 1.

The composition of water-based ink used in the wettability test is as follows.

|  | (Parts by weight) |
|---|---|
| Dye | 7.0 |
| C.I. direct black #19 | |
| Surfactant | 0.2 |
| polyoxyethylene ether | |
| Corrosion inhibitor | 0.2 |
| Benzotriazole | |
| Solvent | |
| Ethylene glycol | 25.0 |
| Triethylene glycol | 5.0 |
| Water | 62.6 |

TABLE 1

| Etching time | None (mirror finish) | 1 Hour | 2 hours | 3 hours |
|---|---|---|---|---|
| Contact angle $\theta$ | 42° | 32° | 25° | 19° |

Table 1 shows that the wettability between the balls and the water-based ink improves when the mirror-finished surface is formed with indentations and that the degree of surface indentations can be controlled by changing the etching time, allowing the wettability of the balls with respect to the water-based ink to be adjusted as desired.

Example 2 (Test to verify the affinity for oil-based ink)

The surface of the 75% mullite-25% zirconium composite ceramics, the same as that used in Example 1, was mirror-finished and then formed with indentations to manufacture balls for ball-point pens 1.5 mm in diameter.

Figure 2:
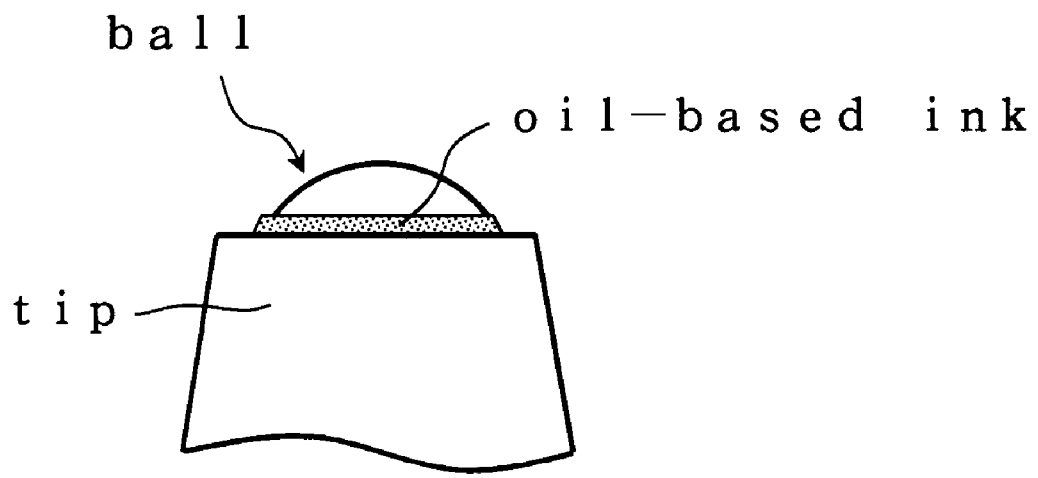
FIG. 2 is a schematic view showing an ink falling from the ball surface a predetermined time after the state of FIG. 1 in the ink adhesion and holding capability test on a ball of a ball-point pen using oil-based ink.

Tests were made to examine the affinity of the balls with respect to oil-based ink. The affinity for oil-based ink can be verified by checking the ink adhesion and holding capability of the ball surface. The ink adhesion and holding capability was tested in the following manner. The ball described above was fitted at a tip end and oil-based ink was filled to assemble a ball-point pen. The ball-point pen was put to use for writing and then set standstill with its tip facing upward. Immediately after writing, the entire surface of the ball exposed from the tip end is covered with ink, as shown in FIG. 1. With elapse of time, the ink moves down by gravity, gradually exposing the ball surface, until the ink moves down to the peripheral portion of the tip end, as shown in FIG. 2. The longer the time it takes for the ink to change from the state of FIG. 1 to the state of FIG. 2, the better the ink holding capability of the ball surface. The relation between the downward-move time or falling time of ink and the etching time spent to form indentations in the ball surface is shown in Table 2.

The composition of the oil-based ink used in the ink holding capability test is as follows.

|  | (Parts by weight) |
|---|---|
| Dye | |
| SBO-Black-GMH | 20.0 |
| Spilon Violet C-RH | 8.0 |
| Spilon Blue C-RH | 4.0 |
| (all produced by Hodogaya Chemical Co., Ltd.) | |
| Solvent | |
| Benzyl alcohol | 8.0 |
| Phenoxyethanol | 40.6 |
| Resin | |
| Polyvinyl pyrrolidone "PVP K-90" | 0.4 |
| (produced by GAF) | |
| Ketone resin "Hilac-111" | 19.0 |
| (produced by Hitachi Chemical Co., Ltd.) | |

TABLE 2

| Etching time | None (mirror finish) | 30 minutes | 1 hour | 2 hour |
|---|---|---|---|---|
| Falling time | Instantaneous fall | 1 minutes | 2 minutes | Does not fall |

Table 2 shows that the oil-based ink holding capability is improved by forming indentations in the mirror-finished surface of the ball and that the size of surface indentations can be controlled by changing the etching time, allowing the oil-based ink holding capability of the ball to be adjusted freely.

Example 3 (Test to verify wear resistance)

A 75% mullite-25% zirconium composite powder was made by the sol-gel method and molded under the molding pressure of 800 kg/cm$^2$. The mold was then sintered in air at the temperature of 1650° C. for one hour and a 75% mullite-25% zirconium composite ceramics was produced. The surface of the composite ceramics was mirror-finished and then formed with indentations (etched for 40 minutes) to manufacture balls for ball-point pens 1.5 mm in diameter.

The ball thus formed was fitted to a ball seat of German silver on the tip end and the same oil-based ink as used in Example 2 was filled to assemble a ball-point pen. The distance by which the ball projects from the tip end immediately after the assembly was 0.410 mm.

Using this pall-point pen, a 1000-meter-long line was drawn under the following conditions.

Tester: MKS writing tester
Point Load (Writing force): 200 g
Writing speed: 4 m/minute
Writing angle: 75°
Writing paper: woodfree paper (JIS 3201)

After the 1000-meter-long line was drawn, the ball projection dimension from the tip end was 0.407 mm, which means that the ball depression due to wear of the ball seat was as small as 0.003 mm.

Industrial Applicability

As can be understood from the foregoing, because this invention uses as a ball material the mullite-zirconia composite ceramics with a specified mullite-zirconia mixture ratio, which has excellent mechanical strength, wear resistance and corrosion resistance, the mirror finish by polishing and the subsequent formation of indentations in the ball surface can be performed effectively.

In addition, because the mirror-finished ball surface is further formed with indentations, the ball excels in terms of both the wettability with water-based ink and the oil-based ink holding capability. This eliminates the complexity, experienced with the conventional manufacturing method, that different materials must be used for balls for water-based ink and balls for oil-based ink. That is, the balls of the same material can be used for any type of ink, whether water-based ink or oil-based ink. Further, by making slight changes in the etching conditions in forming indentations in the surfaces of the balls of the same material, it is possible to manufacture composite ceramics balls for ball-point pens that can apply to any kinds of water-based ink and oil-based ink.

We claim:

1. A method of manufacturing composite ceramics balls for ball-point pens, comprising the steps of:

polishing a composite ceramics into mirror-finished balls, the composite ceramics being made mainly of mullite ($3Al_2O_3 \cdot 2SiO_2$) and zirconia ($ZrO_2$) with a mullite to zirconia ratio of 50–95% by weight to 5–50% by weight; and performing chemical processing or physical processing on the surfaces of the balls to form indentations in the ball surfaces.

2. A manufacturing method according to claim 1, wherein the chemical processing is done by etching.

3. A manufacturing method according to claim 1, wherein the physical processing is done by honing.

* * * * *